United States Patent
Simic et al.

(10) Patent No.: US 7,016,688 B2
(45) Date of Patent: Mar. 21, 2006

(54) FORWARD LINK REPEATER DELAY WATERMARKING SYSTEM

(75) Inventors: Emilija Simic, La Jolla, CA (US); Christopher Patrick, San Diego, CA (US); Douglas Rowitch, Del Mar, CA (US); Luca Blessent, San Marcos, CA (US); Roland Rick, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 203 days.

(21) Appl. No.: 10/435,237

(22) Filed: May 9, 2003

(65) Prior Publication Data
US 2004/0166873 A1 Aug. 26, 2004

Related U.S. Application Data

(60) Provisional application No. 60/449,774, filed on Feb. 24, 2003.

(51) Int. Cl.
*H04Q 7/20* (2006.01)

(52) U.S. Cl. .............. 455/456.1; 455/404.2; 455/456.5; 455/11.1; 342/387

(58) Field of Classification Search .......... 342/357.04, 342/357.03, 357.02, 357.01, 450, 427, 353, 342/387; 455/67.11, 11.1, 423, 456.1–457, 455/404.2, 404.1
See application file for complete search history.

(56) References Cited

U.S. PATENT DOCUMENTS

| | | | |
|---|---|---|---|
| 5,900,838 A | * | 5/1999 | Khan et al. .................. 342/457 |
| 6,108,364 A | | 8/2000 | Weaver, Jr. et al. ......... 375/130 |
| 6,157,842 A | * | 12/2000 | Karlsson et al. .......... 455/456.2 |
| 6,438,381 B1 | | 8/2002 | Alberth, Jr. et al. ........ 455/456 |
| 6,501,955 B1 | * | 12/2002 | Durrant et al. ........... 455/456.1 |
| 6,507,741 B1 | | 1/2003 | Bassirat ...................... 455/440 |
| 6,832,090 B1 | * | 12/2004 | Riley et al. ................. 455/446 |
| 2002/0115448 A1 | * | 8/2002 | Amerga et al. ............. 455/456 |
| 2003/0008663 A1 | * | 1/2003 | Stein et al. ................. 455/456 |
| 2003/0190919 A1 | * | 10/2003 | Niemenmaa ............. 455/456.1 |

FOREIGN PATENT DOCUMENTS

| | | |
|---|---|---|
| GB | 2378614 | 2/2003 |
| WO | 0208725 | 10/2002 |
| WO | 03036824 | 5/2003 |

\* cited by examiner

*Primary Examiner*—Temica Beamer
*Assistant Examiner*—Anthony S. Addy
(74) *Attorney, Agent, or Firm*—Philip Wadsworth; Bruce W. Greenhaus; Richard A. Bachand

(57) ABSTRACT

A forward link repeater delay watermarking (FLRDWM) system and method that enable accurate position location of mobile stations in areas where repeaters are present by watermarking repeated signals with repeater information. A repeater watermarks a forward link signal with a (unique or non-unique) time delay modulation waveform watermark every time a signal passes through the repeater. A mobile station detects and/or identifies the time delay watermark on the forward link signal to determine repeater information that aids the network position determination entity or mobile station position location system in determining position location using AFLT and/or A-GPS systems. A forward link time delay watermarking system can be implemented to achieve low impact on FL and AFLT performance, favorable detection and identification probabilities, and short time-to-detect/identify.

10 Claims, 10 Drawing Sheets

FORWARD LINK REPEATER DELAY WATERMARKING SYSTEM

REFENENCE TO RELATED APPLICATION

Priority is hereby claimed to U.S. Provisional Application No. 60/449,774, filed Feb. 24, 2003, entitled FORWARD LINK REPEATER FREQUENCY WATERMARKING SCHEME.

BACKGROUND OF THE INVENTION

1. Field of the Invention

This invention relates to position location systems that utilize wireless signals to determine the location of an electronic mobile device.

2. Description of Related Art

Existing position location technologies based on GPS use a network of satellites in earth orbit that transmit signals at a known time. A GPS receiver on the ground measures the time-of-arrival of the signals from each satellite in the sky that it can "see". The time-of-arrival of the signal along with the exact location of the satellites and the exact time the signal was transmitted from each satellite is used to triangulate the position of the GPS receiver. A GPS receiver requires four satellites to make a triangulation and the performance of the resulting position location increases as the number of satellites that can be detected increases.

One problem with GPS-based position location determination arises if only three (or less) satellites can be found, and in such an instance (and in the absence of other ancillary information) it is not possible to accurately locate the GPS receiver. For example, if the GPS receiver's view of the sky is obstructed (e.g., deep inside a concrete building) it may not be possible to obtain enough GPS measurements to determine receiver location.

For a wireless communication receiver (i.e. mobile station), the existing wireless network of base stations can be used for position location purposes in a similar manner as the network of GPS satellites for GPS receiver. Theoretically-speaking, the exact location of each base station, the exact time at which the base station is transmitting, and the time-of-arrival of the base station's signal at a mobile station (e.g., cell phone) can be used to trilaterate the position of the mobile station. This technique is referred to as Advanced Forward Link Trilateration (AFLT).

The AFLT method may be used by itself for position location purposes; alternatively, in order to enhance performance of a GPS system, the existing network of wireless communication base stations can be treated as a secondary network of "satellites" for position location purposes in a GPS-capable mobile station (i.e., a device that includes both GPS and wireless communication receivers). The AFLT technique, combined with GPS algorithms, is referred to as hybrid, or Assisted-GPS (A-GPS).

AFLT is a method for determining the position of a mobile station using a plurality of wireless communication network base stations each emitting a unique pilot signal. The AFLT method includes taking a plurality of data measurements of the pilot signals from each of the plurality of base stations. Each of the data measurements includes an earliest time-of-arrival estimate for each pilot signal. In some embodiments, the data measurements further include an RMSE estimate, time of measurement for each time-of-arrival, and an energy measurement (e.g., Ec/Io) for all resolvable paths of the pilot signal.

The data measurements obtained by the AFLT algorithm may be used alone to determine mobile station position; alternatively one or more of the representative AFLT measurements may be used together with representative GPS measurements to determine the position of the mobile station. In some embodiments the mobile station comprises a cell phone and the method further comprises wirelessly connecting the cell phone to one of the cellular base stations prior to taking data; the base station provides a cell search list to the cell phone of all cellular base stations in the area from which data measurements may be taken. In embodiments that include a GPS system, a base station can also provide a GPS search list, which can be used to reduce the time necessary for the mobile station to perform the GPS search and thus to reduce time-to-fix.

In practice, AFLT (including A-GPS) has proven to be of only limited success for position location purposes, in part because repeaters employed in wireless networks cause an ambiguity as to the point of transmission of the pilot signal. In other words, a mobile station cannot currently distinguish whether a received signal was transmitted from the donor Base Transceiver Station (BTS) or the repeater. In such a circumstance, the AFLT measurement cannot be used to accurately determine position because the point of transmission of the pilot signal is unknown (e.g., it is unknown whether it was transmitted directly from a donor BTS or repeated through a repeater). In addition, the repeater will also have internal delays, typically in a range from hundreds of nanoseconds up to tens of microseconds, potentially resulting in a position location error in the range of about 24.4 meters (for 100 nanoseconds) to about 2.44 kilometers (for 10 microseconds).

One proposed solution to the problem of determining location in the presence of repeaters is to simply exclude all AFLT measurements whenever the mobile station is in an area where repeaters are present. However, this solution completely precludes AFLT position location in those areas, and also prevents any AFLT portion of A-GPS from being utilized whenever repeaters are present, thus reducing position location availability and yield, and increasing GPS search windows, resulting in longer times-to-fix.

It has been suggested to introduce a signature on the reverse link, as described in U.S. Pat. No. 6,501,955 in order to help position determination. Unfortunately, the RL signature is likely to be of only limited assistance in mitigating the effects of repeaters on position location, because the mobile station uses AFLT measurements from the forward link (rather than the reverse link) for position location. Since there is no guarantee that the forward link back to the mobile station will follow the same path as the reverse link from the mobile station (i.e., through the same repeater), the reverse link signature is likely to be suboptimal for identifying repeater information for position location purposes. Introducing a signature onto the FL signal has also been suggested, such as described in U.S. Pat. No. 6,501,955, however no practical solution has yet been developed.

SUMMARY OF THE INVENTION

A forward link repeater delay watermarking (FLRDWM) system and method are disclosed that enable position location determination in areas where repeaters are present by watermarking repeated signals with repeater information. The FLRDWM system includes a repeater that watermarks an FL signal with a time delay modulation waveform as it passes through the repeater, and a mobile station that detects and identifies the time delay modulation waveform. The time delay watermark includes repeater information that may be used to determine the position of the mobile station in an area where repeaters are present, using AFLT and/or A-GPS position location systems. The repeater information may simply indicate that the signal is repeated, or may uniquely identify the repeater through which the FL signal passed. The watermark is introduced on the FL signal such that each AFLT measurement can be repeater-screened and thereby used for position location. The forward link repeater delay watermarking system described herein may be implemented to achieve low impact on FL and AFLT performance, favorable detection and identification probabilities, short time-to-detect/identify, and good detection/identification sensitivity.

A method is disclosed for determining position location of a mobile station in the FLRDWM system. The method begins by modulating the forward link signals that pass through a repeater with a time-varying time delay element to watermark repeater information thereon. In some embodiments, all repeaters modulate the FL signal with the same time-varying time delay waveform, thus enabling only repeater detection at the mobile station, i.e., determination only of whether or not the FL signal is repeated. In other embodiments, each repeater modulates the received FL signals with a unique time-varying time delay waveform, thus allowing for detection and identification of the repeater at the mobile station, i.e., determination of whether or not the signal is repeated, and if repeated, from which repeater the signal came.

The mobile station receives the FL signals, performs an AFLT search to obtain pilot phase measurements of the signals, and estimates time delay versus time for the signals. In some embodiments, the time delay versus time estimation is performed on the forward link signals using finger TTLs and/or a repeater searcher, depending on the FL pilot signal strength. In these embodiments, an advantage of using finger TTLs for time delay versus time estimation is that it is performed in parallel with the AFLT search, rather than performed serially (i.e., after the AFLT search) as with the repeater searcher. Accordingly, time delay versus time estimation performed using the repeater searcher increases the time-to-detect/identify as compared with using finger TTLs only. The finger TTL-based FL pilot signal time delay versus time estimation is best suited for the strongest received FL pilot signals that are assigned to the mobile station for the purposes of communication; the repeater searcher is best suited for the weaker FL pilot signals detected by the AFLT search.

The repeater identification system in the mobile station then performs repeater identification to detect and/or identify a watermark on the FL signals responsive to the estimated time delay versus time on the FL signals. The repeater identification system detects a repeated FL signal simply by searching for the presence of a time delay watermark, for example by correlating the estimated signal time delay versus time with all possible repeater time delay watermarks to determine whether the FL signal is repeated. The repeater identification system may also identify a repeater ID on a FL signal, in addition to correlating the estimated signal time delay versus time with all possible repeater time delay watermarks, by identifying the repeater watermark resulting in the best correlation, for example.

The mobile station then determines if sufficient repeater-screened forward link pilot phase measurements have been obtained for position location determination. If sufficient repeater-screened forward link pilot phase measurements have not yet been obtained for position location determination, any remaining detected forward link pilot signals from the AFLT search may be repeater-screened by estimating a signal time delay versus time and performing repeater identification until sufficient repeater-screened pilot phase measurements have been obtained for position location determination. The time delay watermark is removed from all FL signals identified as repeated, and the corrected pilot phase measurements, along with repeater information, are provided to one of a position determining system and a position determining entity to determine the position of said mobile station.

Repeater information obtained during repeater identification contain at least information indicating whether or not the pilot signal was successfully repeater-screened, and if so, whether or not the pilot signal was repeated. In one embodiment, the repeater information contains only an indication of whether or not the pilot signal was successfully repeater-screened, and if yes, whether or not the signal is repeated, such that the mobile station position determining system or network position determining entity may determine the position of the mobile station by excluding measurements from repeated pilot signals and from any pilot signals that have not been successfully repeater-screened. In another embodiment, the repeater search identifies a repeater ID from the watermark, if present. In this embodiment, the repeater information obtained by the repeater identification system and provided to the mobile station position determining system or a network position determination entity also includes the repeater ID for each pilot signal identified as repeated, which allows the use of the repeated signal measurements in calculating the position of the mobile station.

In some embodiments in which A-GPS is used to determine position location, a GPS search is performed prior to performing the repeater search. If sufficient GPS measurements and TTL repeater-screened pilot phase measurements for position location determination are obtained, the repeater search may be skipped in the interest of reducing time-to-fix.

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION

Figure 1:
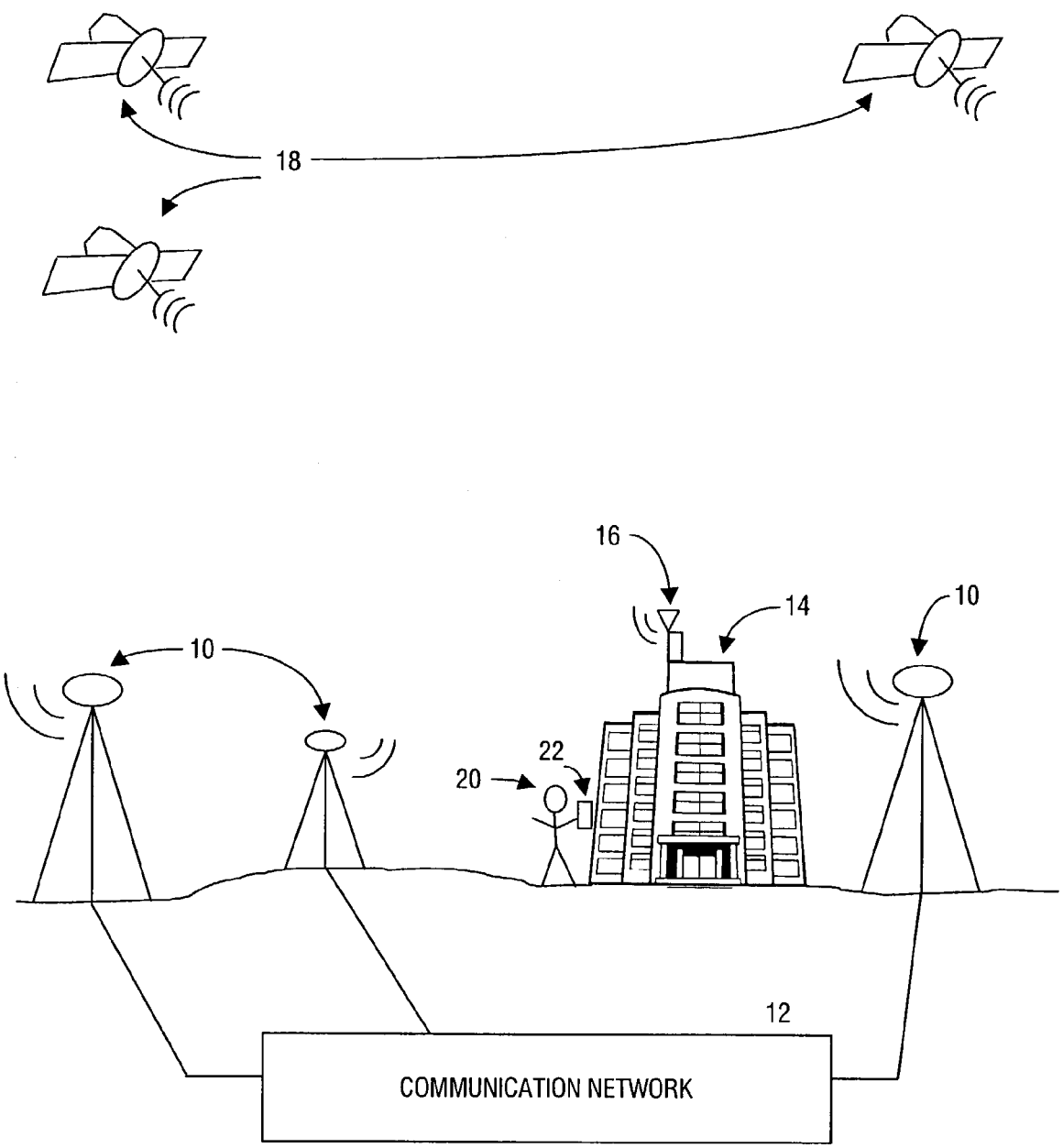
FIG. 1 is a perspective view of a plurality of wireless communications network base stations, a building having a repeater located thereon, GPS satellites, and a user holding a mobile station.

This invention is described in the following description with reference to the figures, in which like numbers represent the same or similar elements.

Glossary of Terms and Acronyms

The following terms and acronyms are used throughout the detailed description:

AFLT Advanced Forward Link Trilateration. A location technique that utilizes the mobile station's measured time-of-arrival of radio signals from base stations (and optionally other terrestrial measurements).

AFLT Searcher A part of the mobile station that conducts searches for the pilot signals from each base station that may be in view.

A-GPS Assisted Global Positioning System. A location technology based on GPS pseudo-range measurements, but utilizing AFLT or similar BTS-based position location technology to assist in determining position.

Base Station A unit that communicates with a mobile station, for example a base station may include Base Transceiver Station (BTS), Mobile Switching Center (MSC), Mobile Positioning Center (MPC), Position Determination Entity (PDE) and any Interworking Function (IWF) required for network connection.

BTS Base Transceiver Station. A fixed station used for communicating with mobile stations that includes antennas for transmitting and receiving wireless communication signals.

C/A codes Coarse/Acquisition codes. Periodic sequences transmitted by GPS satellites, used to identify the transmitting GPS satellite and measure pseudo-range from the observed GPS satellite to a GPS receiver.

CDMA Code Division Multiple Access. A high-capacity digital wireless technology.

CSM Cell Site Modem. Chipsets for wireless base station equipment

Chip (PN) One bit in the PN sequence at the PN chip rate of 1.2288 Mcps.

FL Forward Link. The transmission from a base station (BTS) to a mobile station (MS).

Finger The sub-receivers within the rake receiver assigned to a single receive signal path.

GSM Global System for Mobile Communications.

MS Mobile Station. The term used to describe a subscriber's handset or wireless terminal.

MSM Mobile Station Modem.

PCS Personal Communications Services. All digital cellular transmission that operates in the 1.8 to 2.0 Ghz range.

PDE Position Determining Entity. The network entity that manages the position of the mobile station.

Pilot Set (active) Pilot signals associated with Forward Traffic Channels currently assigned to the mobile station. These are the strongest pilot signals received by a mobile station from local base stations and are typically multi-paths of the same pilot signal.

Pilot Set (candidate) All pilot signals that can be seen by a mobile station whose strength as measured by the mobile station exceeds an "over-the-air" given threshold.

Pilot Set (neighbor) All pilot signals transmitted by base stations in the vicinity of the base station.

Pilot Signals Radio signals received from local base stations that identify the base station.

PN codes Pseudo-random Noise codes. Certain sequences transmitted by a BTS used as identifiers for a cell (or a cell sector), for spreading, and to scramble voice and data transmissions. PN codes are also used to determine pseudo-range from the observed BTS to mobile station.

PPM Pilot Phase Measurement. Measurements of pilot signals obtained from an AFLT search, including a measurement of PN code shift.

PRM Pseudo-range Measurement. Measurements of GPS satellite signals from a GPS satellite search, including a measurement of a C/A code shift.

Repeater A device that receives, amplifies, and retransmits a radio signal between a BTS and a mobile station.

RL Reverse Link. The transmission from a mobile station (MS) to a base station (BTS).

RMSE Root Mean Squared Error. RMSE estimate provides uncertainty of measurement based on the strength of the path used to report pilot phase.

SNR Signal-to-Noise Ratio.

TTL Time Tracking Loop. A part of the mobile station that corrects internal finger timing for active pilot signals in response to measured deviations of the timing of the FL signals due to mobile station movement, thereby enabling accurate demodulation of the FL signal.

Table of Variables

The following variables are used throughout the detailed description:

$T_{sequence}$ Time duration of a sequence of symbols.

$T_{symbol}$ Time duration of a symbol.

A Amplitude of the time delay (e.g., of a symbol).

Environment

FIG. 1 is a perspective view of a plurality of base transceiver stations (BTS's) 10, a building 14 having a repeater 16 located thereon, GPS satellites 18, and a user 20 holding a mobile station 22.

The BTS's 10 comprise any collection of base stations utilized as part of a wireless communication network for connection with a mobile station. A BTS typically provides communication services that allow a mobile station such as wireless phone to connect to another phone over a wireless communication network 12; however, a BTS could also be utilized with other devices and/or for other wireless communication purposes such as an Internet connection with a handheld personal digital assistant (PDA).

In one embodiment, each BTS 10 is a part of a CDMA wireless communication network; however in other embodiments other types of wireless communication networks, such as GSM networks, may be used. In this embodiment, each BTS periodically emits a pseudo-random sequence that uniquely identifies itself. The pseudo-random sequence is a series of bits that are useful for the receiver to lock upon. In CDMA terminology this pseudo-random sequence is termed a "pilot signal"; as used herein, the term pilot signal can apply to any wireless communication system as well as to CDMA systems.

A repeater 16 in its basic form comprises an amplifier, and receives and retransmits pilot signals between a BTS and a mobile station. Repeaters may be situated strategically throughout the cellular network where gaps, interference, and weak service are otherwise found to enhance signal-to-noise ratios by amplifying pilot signals from the BTS to an additional coverage area.

The GPS satellites 18 comprise any group of satellites used for position location determination of a GPS receiver. The satellites continuously send out radio signals that the GPS receiver can detect, and the GPS receiver measures the amount of time it takes for the radio signal to travel from the satellite to the receiver by correlating the local replica of GPS satellite C/A code and shifting it in time until it achieves correlation with the received satellite C/A code. Since the speed at which the radio signals travel is known, and the satellites are synchronized to periodically emit their signal every millisecond coincident with "GPS time", it is possible to determine how far the signals have traveled by determining how long it took for them to arrive. To a user situated in open space, the GPS receiver typically has an unobstructed view of the satellites; thus, when the user is in open space, measuring the time-of-arrival of the GPS signal is straightforward because it is typically a straight "line-of-sight" from the satellite to the receiver. However, in the wireless communication context, a user may be situated in a city with buildings or other obstacles that may make GPS positioning more difficult.

Figure 2:
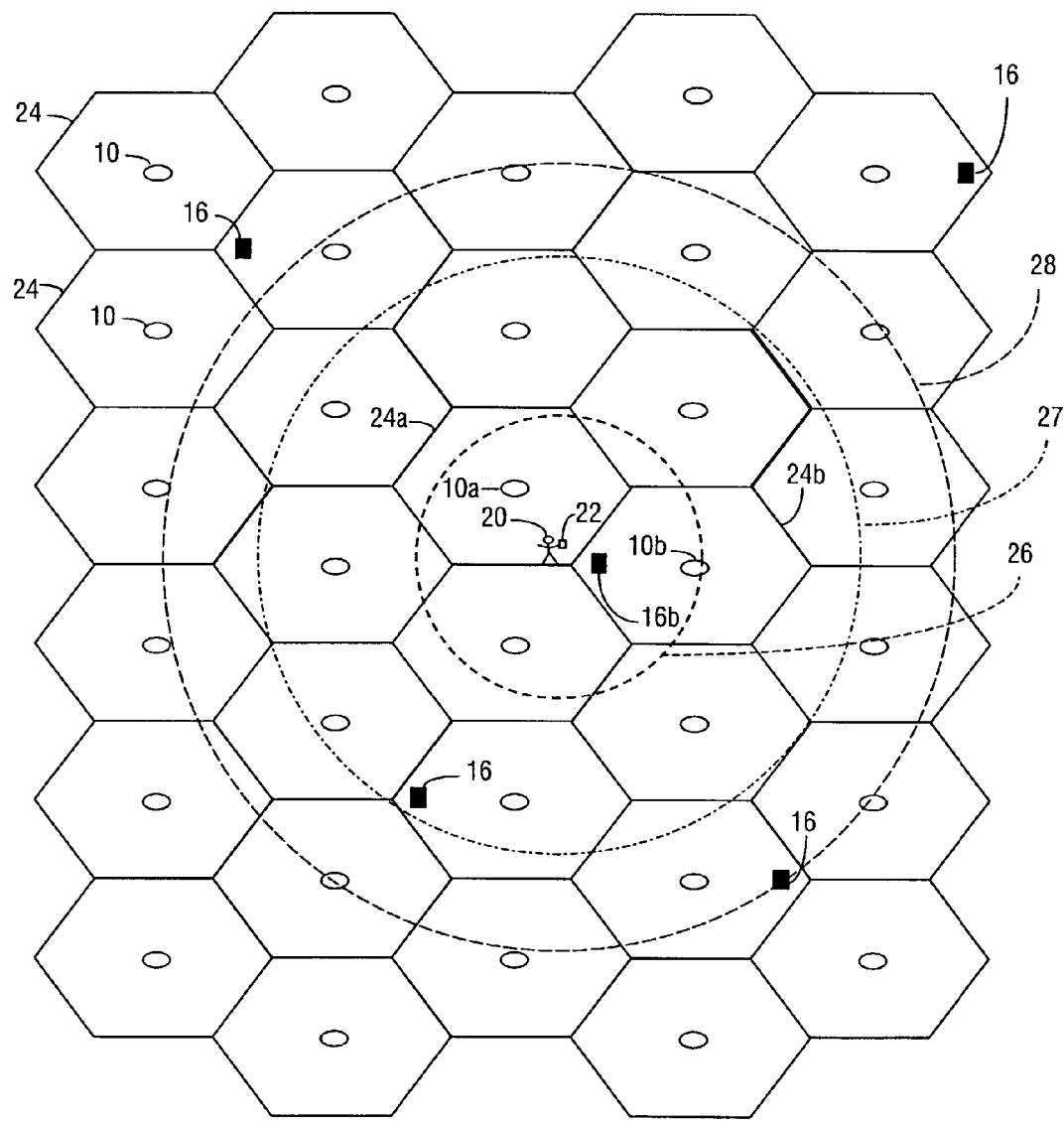
FIG. 2 is an illustration of an exemplary cellular base station coverage area structure.

FIG. 2 illustrates an exemplary cellular BTS coverage area structure. In such an exemplary structure, a plurality of hexagonal BTS coverage areas 24 abut one another in a symmetrically tiled arrangement. Each BTS 10 is located respectively within each of the BTS coverage areas 24 and provide coverage within the area in which it is located. Particularly, for purposes of description herein, a BTS 10a provides coverage within a coverage area 24a, a BTS 10b provides coverage within a coverage area 24b, and so forth.

In an ideal cellular communication network, coverage areas 24 are configured adjacent to each other to provide continuous cellular coverage to a mobile station as it travels through the various coverage areas. However, most cellular coverage areas have gaps, interferences, and other obstacles that cause problems with cellular coverage. For example, environments like tunnels, garages, and sports arenas create problems for cellular services. As other examples, extended highway and rural coverage can be very expensive to maintain with a BTS. Thus, one or more repeaters 16 may be placed within a coverage area in order to enhance or extend the coverage of a BTS at a much lower cost than installing another BTS.

In one embodiment, repeaters 16 comprise antennas and transceivers that send and receive signals between a mobile station and a BTS, such as will be described in more detail with reference to FIG. 3. In one simple example, a repeater amplifies the received signals and retransmits them on the same frequency.

In FIG. 2, the user 20 holding the mobile station 22 is located within the first coverage area 24a. The mobile station 22 may be unable to receive a sufficiently strong pilot signal from a first BTS 10a due to interference from an obstacle such as a large building (not shown). Additionally, the mobile station 22 may be unable to receive a sufficiently strong pilot signal directly from the second BTS 10b due to the relatively far distance. However, a repeater 16b is placed appropriately within coverage area 24b, such that the location of the mobile station 22, which would otherwise experience a gap in service, may be sufficiently covered. In other words, when a pilot signal is transmitted from the second BTS 10b, it will be amplified through the repeater 16b and received at the mobile station 22.

The mobile station 22 has position location capabilities such as described above, including AFLT, and therefore can utilize not only the pilot signals currently assigned to the mobile station (e.g., active set), but can also utilize other pilot signals beyond the active set for purposes of determining the position of the mobile station.

In an example implementation that utilizes CDMA technology, the mobile station searches for pilot signals present in a neighbor list, which is a list of pilot signals in the vicinity that might be receivable by the mobile station. The neighbor list may be supplied from a base station, for example. Certain pilots from the neighbor list may be included in the candidate set (i.e., pilot signals that can be seen by a mobile station whose strength as measured by the mobile station exceeds an "over-the-air" given threshold) or the active set (i.e., pilot signals associated with Forward Traffic Channels currently assigned to the mobile station, which are the strongest pilot signals received by a mobile station from local base stations and are typically multi-paths of the same pilot signal), according to current CDMA standards.

In order to use AFLT measurements in position location determination of the mobile station 22, the pilot signals (whether in the active, candidate or neighbor set) must be successfully screened for repeaters, and if repeated, the mobile station must determine from which repeater the signal came; additionally, the location and internal delays of the repeaters must also be known and available in order to use repeated AFLT measurements in the position location calculation.

As previously described herein, conventional AFLT and A-GPS positioning systems within the mobile station do not detect and/or identify whether a signal is repeated or not, which makes the pilot phase measurements substantially useless for position location in an area having repeater coverage. To address this problem, a repeater that is able to uniquely watermark a forward link signal, and a mobile station that is able to detect and identify a watermarked repeated signal are disclosed herein. Because the mobile station is able to detect and identify whether or not a signal is repeated, and if repeated, from which repeater the signal came, accurate position information may be determined using any of the FL signals received by the mobile station.

In some implementations, it may be necessary only to detect whether or not the pilot signal is repeated, rather than identifying the particular repeater that repeated the signal. For this purpose an alternative embodiment is disclosed in which the mobile station detects only whether the FL signals are repeated (without identifying a unique repeater ID). Because the mobile station in this embodiment is able to only able to detect whether or not a signal is repeated, all the repeated pilot signals (and the pilot signals that are not successfully repeater-screened) must be excluded from the position location determination.

Description

Figure 3:
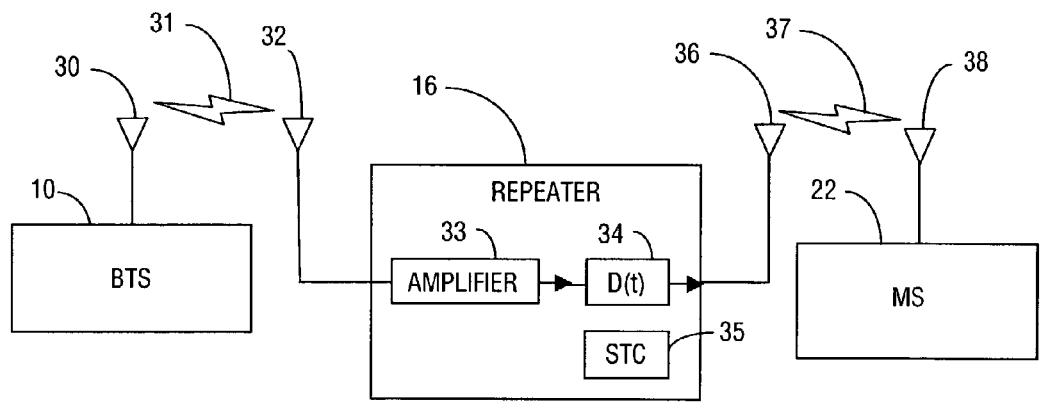
FIG. 3 is a block diagram of a forward link repeater delay watermarking (FLRDWM) system including a base transceiver station (BTS), a repeater, and a mobile station (MS)

FIG. 3 is a block diagram of a communication system that implements an FLRDWM system. The communication system includes a base transceiver station (BTS) 10, a repeater 16, and a mobile station (MS) 22. The BTS 10 has an antenna 30 for transmitting a forward link pilot signal 31 therefrom. The repeater 16 has a first antenna 32 for receiving the forward link signal 31 from the BTS 10, an amplifier 33 for amplifying the signal, a time-varying delay element 34 for watermarking the FL signal, a system time clock 35, and a second antenna 36 for transmitting the watermarked forward link signal 37 to the MS 22. The MS has an antenna 38 for receiving the watermarked forward link signal 37 from the repeater.

The BTS 10 may comprise any appropriate base station used for wireless communication. In one embodiment, the BTS is configured for a CDMA network; however, in other embodiments, the BTS may be implemented for other wireless communication networks, such as TDMA and GSM. Although only one antenna 30 for transmitting signals is shown, it should be understood that the BTS has a typical configuration of a BTS, including one or more transceivers and antennas for transmitting and receiving signals. In a CDMA implementation, each BTS transmits in synchronization with a system time base.

The repeater 16 comprises any appropriate repeater that has an amplifier 33 for amplifying telecommunication signals; that is, the repeater 16 comprises any suitable configuration that receives, amplifies, and retransmits telecommunication signals to and from the BTS 10 and the MS 22. Additionally, the repeater comprises the time-varying delay element 34 that watermarks the forward link signal 31 with a time delay watermark as will be discussed in more detail with reference to FIG. 4 or FIG. 5, for example. Accordingly, the repeater also comprises a system time clock (STC) 35 to accomplish time synchronization of the time delay watermark sequence to the system time as it is modulated onto the FL signal by the time-varying element.

In one embodiment, the repeater 16 comprises first and second antennas 32, 36. The first antenna 32 is used to receive the forward link signal 31 and the second antenna 36 is used to retransmit the forward link signal 37 out of the repeater. It may be noted that although the repeater in FIG. 3 shows only an amplifier and a time-varying delay element therein, it should be understood that the repeater 16 includes additional components in any suitable configuration; for example, the repeater may also comprise transceivers (transmitters/receivers) that function to receive and retransmit signals into and out of the repeater 16 via the antennas 32, 36. It may be noted that the repeater may comprise alternative configurations; for example, the repeater may be connected to the BTS via a wired connection. One such example includes an optical repeater that receives an optical signal (e.g., fiber optic), amplifies it (and/or reshapes, retimes, frequency shifts, and otherwise reconstructs it), and retransmits it wirelessly (on the same or different frequency).

The repeater 16 includes the time-varying delay element 34 that modulates the forward link signal 31 with a time delay watermark, such as the watermarks described in more detail with reference to FIG. 4 or FIG. 5, for example. The time delay element watermarks the FL signal to identify it as a repeated signal, and the watermark may include a uniquely encoded sequence that identifies the repeater through which the signal passed. By watermarking the repeated forward link signal, the mobile station can determine which of the pilots are repeated, and by uniquely watermarking the repeated forward signal with a unique sequence, the repeater that repeated the signal can be identified. Using this information, accurate position location information may be obtained using AFLT or other similar position location technology.

Still referring to FIG. 3, the mobile station 22 has an antenna 38 for receiving telecommunication signals from a BTS and/or repeater, such as the watermarked forward link signal 37 from the repeater 16. As will be described in more detail with reference to FIGS. 6 to 8, the MS 22 can detect the time delay watermark on a FL signal, if any, distinguish whether the signal came from a repeater, and in some embodiments identify which particular repeater transmitted the signal, thus enabling accurate AFLT measurements to be achieved and enabling them to be used in position location calculation as will be described elsewhere herein.

Figure 4:
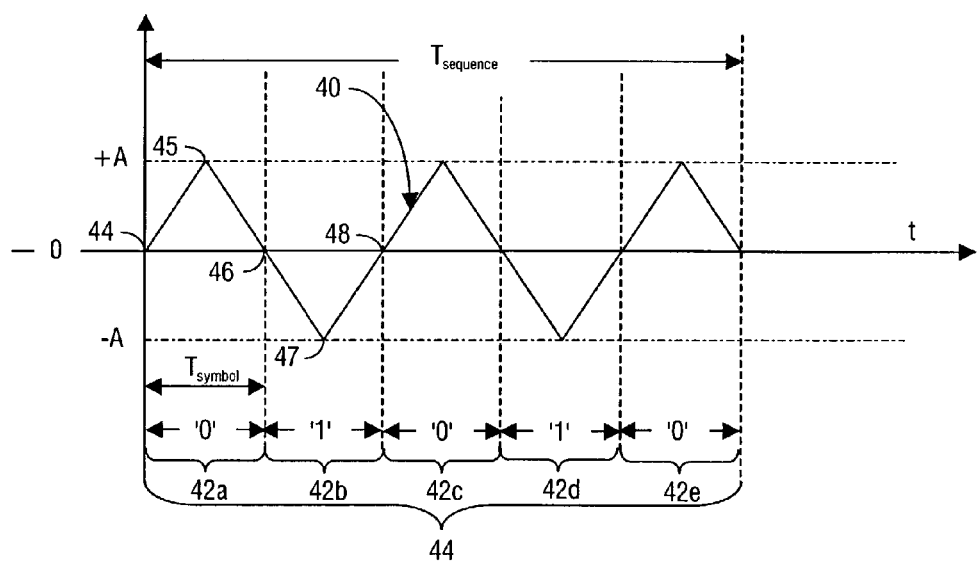
FIG. 4 is a graph that shows a binary-encoded modulation waveform, which is one example of a waveform that may be utilized by the time-varying delay element (FIG. 3) to watermark the FL signal.
Figure 5:
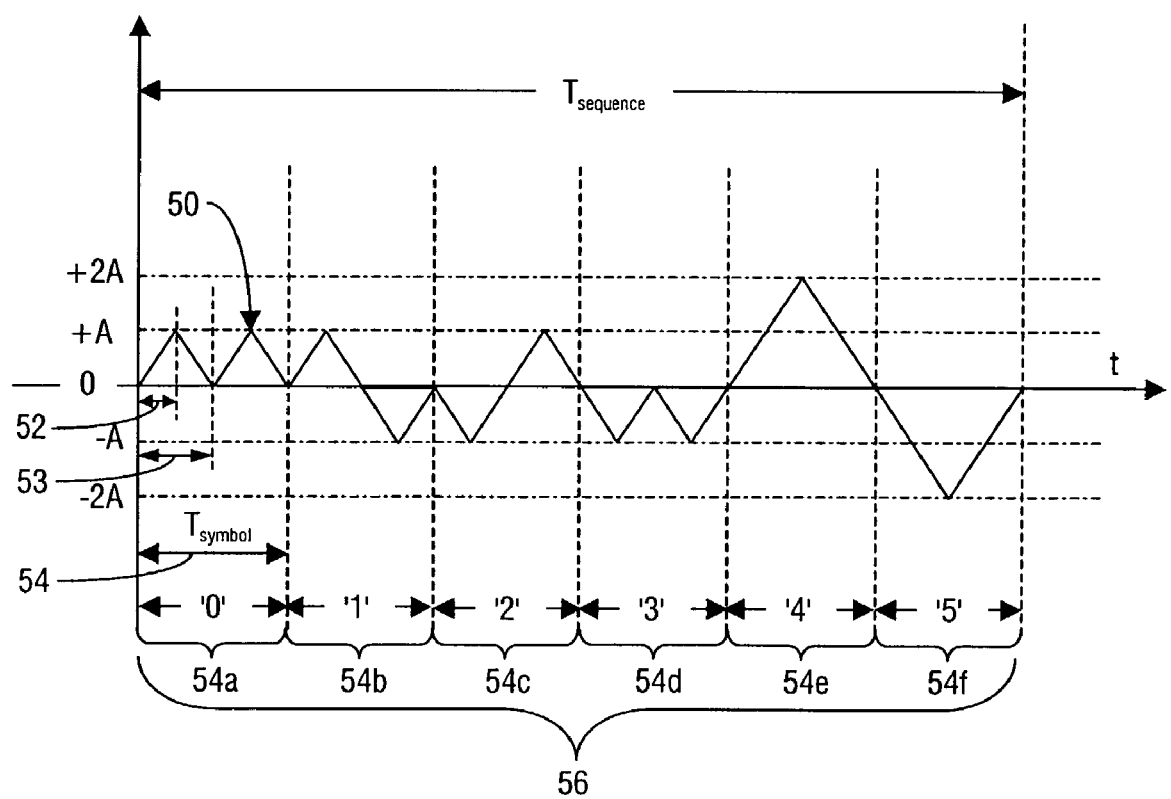
FIG. 5 is a graph that shows an example of a modulation waveform that utilizes 6-ary encoding to watermark the FL signal.

FIGS. 4 and 5 illustrate two example time delay modulation waveforms that may be used to watermark the FL signal. In the graphs of FIGS. 4 and 5 the horizontal axis represents time (t), and the vertical axis represents the magnitude of the time delay modulation waveform (D) as measured from the system time clock. Thus, these graphs plot the function D(t), i.e., time delay modulation waveform vs. time.

FIG. 4 shows one example of a time delay watermark in which repeater information is encoded in a sequence of binary symbols. In FIG. 4, the binary symbols have a triangular shape with peak magnitudes of +A or −A, as described in more detail herein. FIG. 5 shows another example of a watermark wherein repeater information is encoded within the watermark using a 6-ary symbol sequence, including one or more triangular shapes that form each symbol, such as described in more detail herein.

In addition to the time delay watermark having a triangular-shaped waveform such as shown in FIGS. 4 and 5, it should be noted that a variety of different waveforms may be utilized to provide the time delay; for example, step, sine, and/or ramp waveforms may be utilized.

In one embodiment, the waveform D(t) can be designed to further distinguish from the naturally occurring phenomenon that normally occurs due to mobile station motion (e.g., code Doppler and fat path) by differentially encoding the time delay waveform in N received signal paths (where N is an integer, e.g., 2). In this embodiment, the repeater element 34 (FIG. 3) would include N delay elements (e.g., 2) that would time modulate the received FL signal with multiple time delay waveforms $D1(t), D2(t), \ldots DN(t)$ and perform summation on them prior to re-transmitting the FL signal via the antenna 36. In this case, since $D(t)=D1(t)+D2(t)+ \ldots +DN(t)$, the requirements on the individual time delay waveforms could be relaxed, or alternately, the detection probability in the mobile station may be increased. It may be noted that extra resources (i.e., extra N−1 fingers) in the mobile station may be needed to achieve a desired detection probability.

Furthermore, any M-ary encoding scheme (where M is an integer) may be utilized to encode repeater information on the FL signal, and alternatively a variety of other encoding schemes may be implemented to encode the symbol sequence, for example PSK encoding schemes (e.g., BPSK, QPSK, etc.) or a periodic time delay waveform with the frequency of the time delay waveform encoding the repeater ID thereon.

In embodiments that require only detection of a repeated signal (i.e., identification of a unique repeater ID is not required), the mobile station may simply detect whether the signal is repeated or not, without identifying the repeater through which the signal passed. In this case, since the presence of the watermark simply indicates that the pilot signal is repeated, and no additional information is necessary, all the repeaters could be assigned the same watermark. However, in other embodiments where both detection and identification of a repeated signal are required, a repeater ID unique to each repeater may be encoded within each watermark such that the mobile station may be able to not only detect the presence of the watermark, but may also identify the repeater that repeated the FL signal.

Reference is now made to FIG. 4, which shows one example of a watermark 40 that may be modulated onto the FL signal as it passes through a repeater. The graph of FIG. 4 plots a sequence of symbols formed by varying the delay (D) as a function of time, where A is the peak magnitude of the delay. Particularly, the watermark 40 comprises a sequence of five modulation symbols 42a, 42b, 42c, 42d, and 42e that form a sequence 44 that uniquely identifies the repeater that repeated the FL signal. In the example of FIG. 4, each symbol has an approximately triangular shape with a peak defined by either a positive time delay +A or a negative time delay −A. In FIG. 4, a simple binary encoding scheme is used wherein the symbol '0' is encoded as a time-varying delay comprising a ramp up from zero 44 to a positive peak 45, followed by a ramp down from the positive peak 45 to zero 46, and the symbol '1' is encoded as a ramp down from zero 46 to a negative peak 47 followed by a ramp up from the negative peak 47 to zero 48.

In the example embodiment of FIG. 4, the watermark 40 comprises a five-symbol binary sequence, which allows $2^5$ (i.e., 32) possible binary sequences, thus the encoding of 32 possible repeater IDs. It should be apparent that any n-symbol binary sequence may be utilized (where n is an integer); in other words the number n of symbols that define the watermark may be increased or decreased, which will correspondingly increase or decrease the number of supported repeater IDs since the number of possible watermarks is equal to $2^n$ in this embodiment. However, depending up increasing or decreasing the number of symbols that define the watermark may respectively increase or decrease the time-to-detect.

It may be noted that the triangular symbols in FIG. 4 have an approximately constant slope (i.e., a constant rate of change of time delay) of either $+2 \text{ A}/T_{symbol}$ or $-2 \text{ A}/T_{symbol}$. For example, in one implementation of the embodiment of FIG. 4, each symbol 42 has time duration $T_{symbol}$ of about one second with a maximum time delay magnitude A of about 1.5 chips, and therefore each ramp has a slope of about three chips/sec. For a five-symbol watermark, the sequence time duration $T_{sequence}$ would be about five seconds in this implementation.

In any particular implementation, the choice of delay modulation waveform D(t) and its characteristics, e.g., symbol time duration $T_{symbol}$, and amplitude A, and the maximum amplitude over the sequence time duration $T_{sequence}$ are selected to satisfy three conditions: minimal impact on FL performance, maximum repeater detection/identification probability in the mobile station, and minimal time-to-detect/identify. For example, in order to maximize repeater detection/identification probability in the mobile station, the magnitude of the time delay waveform, its slope, and its duration should be maximized to distinguish the time delay watermark from naturally occurring time variations due to the mobile station.

In one such example, the magnitude may be chosen considering the maximum code Doppler accrued during the sequence time duration of the watermark, the timing jitter of the time tracking loop, and the jitter that occurs in the receiving signal peak location (due to the presence of fatpath), all of which contribute to the probability of detection at the mobile station. Thus, assuming the worst-case code Doppler rate of 0.5 chips/second, a standard deviation of time tracking loop of 0.0375 chips, and a change in received signal peak due to a fat path of one chip, the amplitude A of the symbol 42 may be designed with at least 1.3625 chips in the symbol duration $T_{symbol}$ of 0.5 seconds. It may be noted that if the resulting slope and magnitude are not much larger than this, then the modulation symbol should have additional properties that distinguish it from naturally occurring phenomenon (e.g., it should consist of a triangular waveform, as opposed to just ramp). In order to limit any impact it may have on FL performance, the delay watermark must minimally degrade FL signal SNR (e.g., no average degradation to exceed 0.2 dB in CDMA systems), minimally increase finger re- or de-assignment rate, and minimally increase probability that the repeated PN will fall outside of search window sizes (e.g., such as specified in IS-98A/B and IS-2000 in CDMA systems) and thus reduce FL measurement yield. These requirements will impose the type of the modulation waveform (e.g., ramp, step, triangle, etc.), and set the upper limit on the maximum allowable symbol slope and magnitude (e.g., A and $2 \text{ A}/T_{symbol}$ in FIG. 4, and $2 \text{ A}$ and $4 \text{ A}/T_{symbol}$ in FIG. 5), and maximum allowable peak-to-peak variation over the sequence duration $T_{sequence}$ (e.g., 2 A in FIG. 4, and 4 A in FIG. 5), narrowing the allowable types of modulation symbol and encoding schemes. Finally, in order to minimize time-to-detect/identify, a minimal symbol duration $T_{symbol}$ should be chosen that satisfies all the requirements discussed previously should be chosen.

Reference is now made to FIG. 5, which shows another example of a watermark 50 that may be modulated onto the FL signal as it goes through the repeater. The graph of FIG. 5 plots a sequence of symbols formed by varying the delay (D) as a function of time, where 2 A is the peak magnitude of the delay. Particularly, the watermark 50 comprises a sequence of six modulation symbols 54a, 54b, 54c, 54d, 54e, and 54f that form a sequence 56 that uniquely identifies the repeater that repeated the FL signal. In this example of 6-ary encoding, a ramp up may comprise a slope of quarter symbol time duration 52 (such as shown from zero to +A in symbol '0') or of half symbol time duration 53 (such as shown from zero to +2 A in symbol '4'), and a ramp down may comprise a slope of quarter symbol time duration 52 (such as shown from +A to zero in symbol '0') or of half symbol time duration 53 (such as shown from +2 A to zero in symbol '4'). Accordingly, a full symbol time duration $T_{symbol}$, comprises a combination of ramps up and down that form one or more triangular shapes as described above, and shown with reference to FIG. 5.

In the example of FIG. 5, the watermark 50 comprises a six-symbol 6-ary sequence, which allows $6^6$ (i.e., 46656) possible watermarks, thus allowing the encoding of 46656 possible repeater IDs. It should be apparent that any n-symbol 6-ary sequence may be utilized (where n is an integer); in other words, the number n of symbols that define the watermark may be increased or decreased, which will correspondingly increase or decrease the number of supported repeater IDs since the number of possible watermarks is equal to $6^n$ in this embodiment. However, depending upon the implementation, it is possible that increasing or decreasing the number (n) of symbols that define the watermark may respectively increase or decrease the time-to-detect.

In comparison with the embodiment of FIG. 4 in which binary encoding was used to create the watermark, in FIG. 5 the maximum slope variation and the symbol time duration $T_{symbol}$ of this 6-ary encoding is about double that of binary encoding, and each symbol has six possible values as opposed to only two possible values as in the binary encoding embodiment above. Similar to the watermark shown in FIG. 4, the maximum variation of the amplitude of the watermark in this embodiment is independent of the number n of symbols in the sequence, however the amplitude may now be twice as large as in the embodiment of FIG. 4 (e.g., ±2 A=±3 chips). The number of unique sequences supported by the 6-ary encoding is significantly higher than that of the binary encoding scheme for the same sequence time duration. For example, for a two-symbol 6-ary sequence duration of four seconds, the number of symbol sequences supported is $6^2=36$, thus 36 unique watermarks; for three-symbol 6-ary sequence of six seconds, the number of symbol sequences supported is $6^3=216$, thus 216 unique watermarks. It follows then that in the six-symbol 6-ary sequence example implementation of FIG. 5, $6^6=46656$ unique watermarks may be used to identify repeaters.

The watermarks described with reference to FIGS. 4 and 5 are advantageous for a number of reasons. For example, the choice of a triangular waveform for the symbol (e.g., as opposed to ramp) used in the embodiments of FIGS. 4 and 5 results in zero net drift in finger position; that is, all symbols begin and end at zero. Net zero drift position allows for accurate estimation of the signal time delay versus time at the mobile station and minimal impact on forward link measurement yield. Additionally, the triangular-shape of the waveforms that form the watermarks of FIGS. 4 and 5 is advantageous at least in part because its properties distinguish it from naturally occurring phenomenon, resulting in higher repeater detection/identification probability. In addition, the slope of the ramp may be designed to be greater than that of naturally occurring phenomenon; that is, a higher slope allows for greater detection probability of the watermark at the mobile station because of its distinctness from random expected time delays that may arise from other sources. The upper limit on the ramp slope may be set by the criteria on the maximum allowable impact on the forward link SNR or on the finger de- or re-assignment rate to minimize impact on the FL signal.

It may be noted that while some examples of implementation in a CDMA system are given here, time delay modulation may be implemented in a variety of wireless communication systems, such as TDMA and GSM.

Mobile Station

Figure 6:
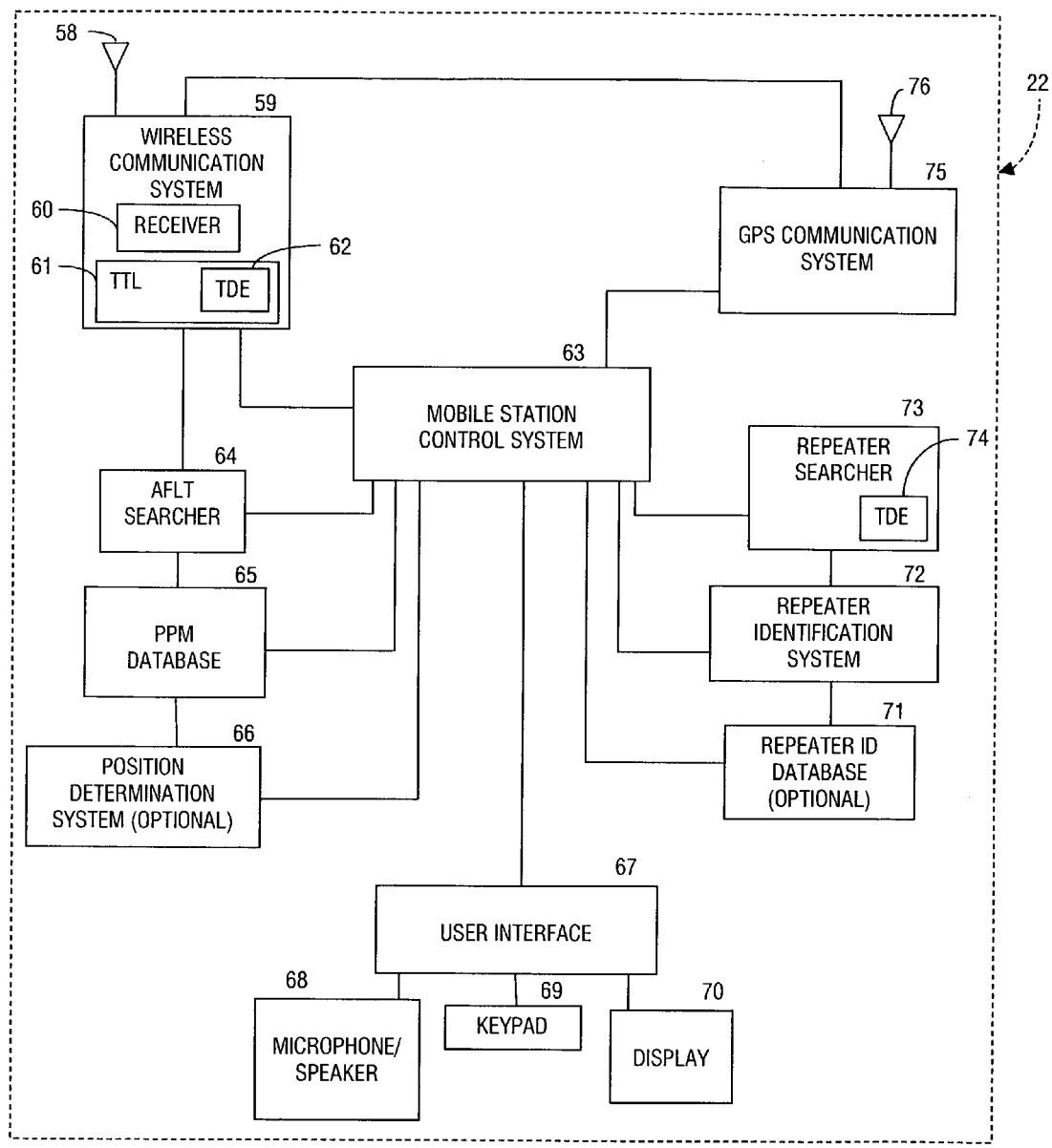
FIG. 6 is a block diagram of one embodiment of a mobile station incorporating wireless communication and position location capabilities, and including a repeater identification system.

FIG. 6 is a block diagram of one embodiment of the mobile station 22 incorporating AFLT and GPS-based position location capabilities, and including a repeater identification system capable of detecting a watermark on an FL signal (i.e., if the signal is repeated). If a watermark is detected on an FL signal, the mobile station can also extract repeater ID information from the watermarked repeated FL signal. It may be noted that although the embodiment of FIG. 6 utilizes both GPS and/or AFLT to determine position, alternative embodiments may use AFLT alone.

In FIG. 6, a wireless communication system 59 is connected to an antenna 58. In one embodiment, the wireless communication system 59 comprises a CDMA communication system suitable for communicating with a CDMA network of wireless BTS's; however in other embodiments, the wireless communication system may comprise another type of network such as TDMA or GSM. The wireless communication system 59 comprises suitable devices, hardware, and software for communicating with and/or detecting signals from a BTS, including a receiver 60 for receiving FL signals and a time tracking loop (TTL) 61 that establishes and maintains appropriate timing for forward link signals.

The receiver 60 receives FL signals and provides initial processing of the FL signals. In one embodiment, the receiver 60 may be a rake-type receiver with multiple fingers for receiving multiple pilot signals in parallel. It may be noted that additional receivers may be optionally provided to obtain signal diversity, in some designs.

A time tracking loop (TTL) 61 is implemented in each finger of the mobile station and includes a time delay estimator (TDE) 62 that estimates the time delay of FL signals versus time. The TTL uses the time delay estimated by the TDE to correct the internal finger timing and accurately estimate the timing of the incoming FL signals, thereby enabling accurate demodulation. The corrections made by the TTL account for time delays or shifts impressed on the incoming FL signal for example due to code Doppler, resulting from the changing positions of a subscriber compared to a base station, and certain multi-path conditions. Additionally, if an incoming FL signal includes a time delay watermark as described herein, the TDE is also able to estimate that time delay waveform, and the TTL is able to correct the forward link signal accordingly.

The time delay estimator (TDE) 62 is provided within the TTL for estimating the time delay of the FL signals versus time. The TDE estimates the time delay at a rate that allows the TDE to adequately estimate the waveform of the time delay. For fingers tracking the same forward link signal, the tracking is done on the earliest arriving path.

The TDE outputs the time delay as a waveform that includes the delay as a function of time. It may be noted that if there is no time delay, the waveform is substantially zero. If there is some time delay, the waveform will include the delay as a function of time, accordingly.

A mobile station control system 63 typically includes a microprocessor that provides standard process functions, as well as other calculation and control systems necessary to perform required MS processing. The mobile station control system 63 generally connects the various systems of the MS together.

An AFLT searcher 64 connected to the wireless communication system 59 and mobile station control system 63. The AFLT searcher detects pilots and performs pilot phase measurements on the mobile station's found pilot signals, and supplies those measurements to a pilot phase measurement (PPM) database 65.

The pilot phase measurement (PPM) database 65, which is connected to the control system 63, is provided to store information regarding observed data measurements from the AFLT searcher, for example time-of-arrival, RMSE, and Ec/Io. A pilot ID uniquely identifies each pilot signal in the database.

A position determination system (PDS) 66, which may be optionally provided within the mobile station, is connected to the mobile station control system 63 and the PPM database 65; the position determination system 66 requests information and operations as appropriate from the other systems (eg. GPS communication system 75, PPM database 65, and repeater identification system 72), and performs the calculations necessary to determine the mobile station's position using measurements obtained by any suitable AFLT algorithm, GPS algorithm, or a combination of AFLT and GPS algorithms (in A-GPS). To that end, the PDS 66 may also comprise a database (not shown) of locations and internal delays of each BTS and repeater.

It should be noted that the PDS 66 may function alone, without the network position determining entity (PDE); that is, the MS may determine its own position without assistance from a resource outside the MS (standalone mode). Alternatively, the PDS 66 may function together with the PDE residing elsewhere in the network; for example, the PDE may assist the MS in generating a GPS search list (e.g., by providing a GPS almanac and ephemeris to the MS), while the MS may perform position calculation (MS-based mode). However, in some alternative embodiments, the mobile station control system 63 may receive GPS acquisition assistance (e.g., a GPS search list with search windows both in code and frequency) from an external PDE and communicate some or all of the position measurement information (e.g., AFLT and GPS measurements, repeater information, and so forth) to a PDE outside the MS, which calculates the position of the MS and possibly sends the position back to the MS through the wireless communication network. The PDE may reside on one or more external processing systems that are networked to communicate with the mobile station. In yet another alternative embodiment, the PDE system could be modified to include sending repeater aiding information to the MS that is available to the serving base station, for example all of the possible repeaters on a particular PN, their repeater IDs, and their internal delays (and potentially their locations, if position location is to be performed at the MS). This may aid in reduction of repeater time-to-identify and thus reduce time-to-fix.

A user interface 67 includes any suitable interface systems, such as a microphone/speaker 68, keypad 69, and display 70 that allow user interaction with the MS. The microphone/speaker 68 provides for voice communication services using the wireless communication system. The keypad 69 comprises any suitable buttons for user input. The display 70 comprises any suitable display, such as a backlit LCD display.

A GPS communication system 75 is connected to the mobile station control system 63 and to an antenna 76, and comprises any suitable hardware and software for receiving and processing GPS signals.

A repeater searcher 73 is connected to the mobile station control system and comprises suitable hardware and software to run a simplified repeater AFLT search on pilot signal samples of selected FL signals found by the regular AFLT searcher 64. The repeater searcher may include longer accumulation time as compared to the AFLT searcher 64 to achieve processing gain necessary for reliable detection/identification.

A time delay estimator (TDE) 74 is provided within the repeater searcher 73 for estimating the time delay in the repeater searched FL signals versus time, in a manner similar to that of the TDE 62 in the TTL 61. That is, the TDE estimates each FL signal time delay at a rate that allows the TDE to adequately estimate the waveform of the time delay. The TDE outputs the time delay as a waveform that represents the delay as a function of time. It may be noted that if there is no time delay, the waveform is substantially zero. If there is some time delay, the waveform will include that time delay as a function of time accordingly.

A repeater identification (ID) system 72 is connected to the control system 63 and comprises any suitable hardware, firmware and/or software that performs repeater identification on the time delay output from the time delay estimators (TDE) 62, 74. That is, the mobile station control system 63 receives the estimated FL signal time delay versus time from the TDE 62 within the TTL 61 and/or the TDE 74 within the repeater searcher 73 and sends this estimated FL signal time delay versus time to the repeater ID system 72. In one embodiment, the repeater ID system includes a correlator that determines repeater information from the estimated FL signal time delay versus time by correlating the time delay data with known watermarks to determine the repeater information therefrom. For example, in one embodiment matched-filter based algorithms can accomplish the extraction of repeater identification from the time delay data.

In some embodiments, a repeater ID database 71 may be optionally provided and may hold information about repeated signals within the vicinity of the mobile station to aid in detection and position location. The repeater ID database 71, connected to the repeater ID system 72, may be useful to assist in identifying a repeater; for example, the information in the repeater ID database may be sent to the PDS internal in the mobile station or to the network PDE external to the MS for using the repeated pilot signals in determining the position of the MS. It may be noted that the information stored in the repeater database may optionally be housed external to the MS in the PDE, such as described with reference to the PDS 66.

Figure 7:
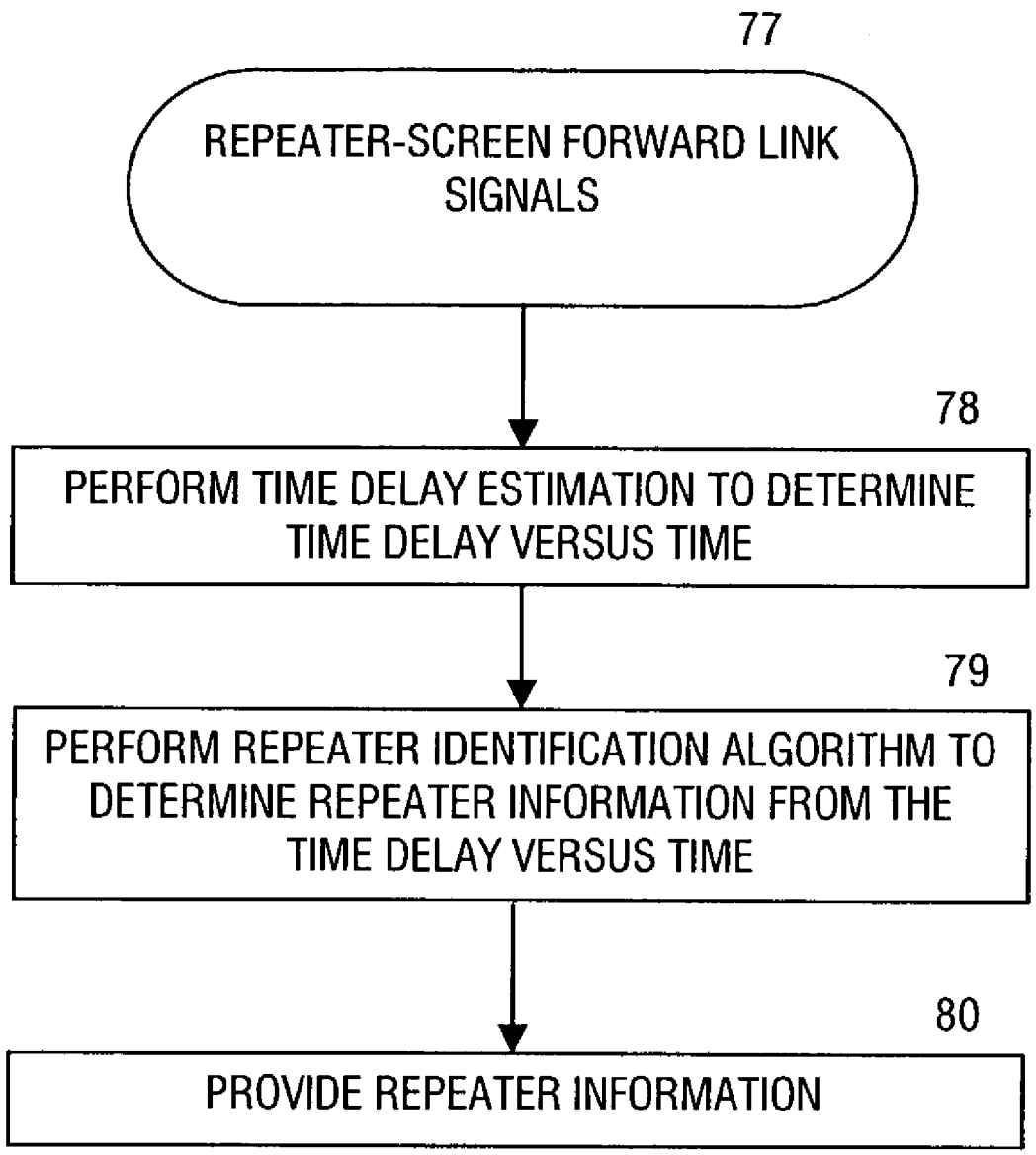
FIG. 7 is a flow chart that illustrates two core steps involved in repeater-screening FL signals.
Figure 8:
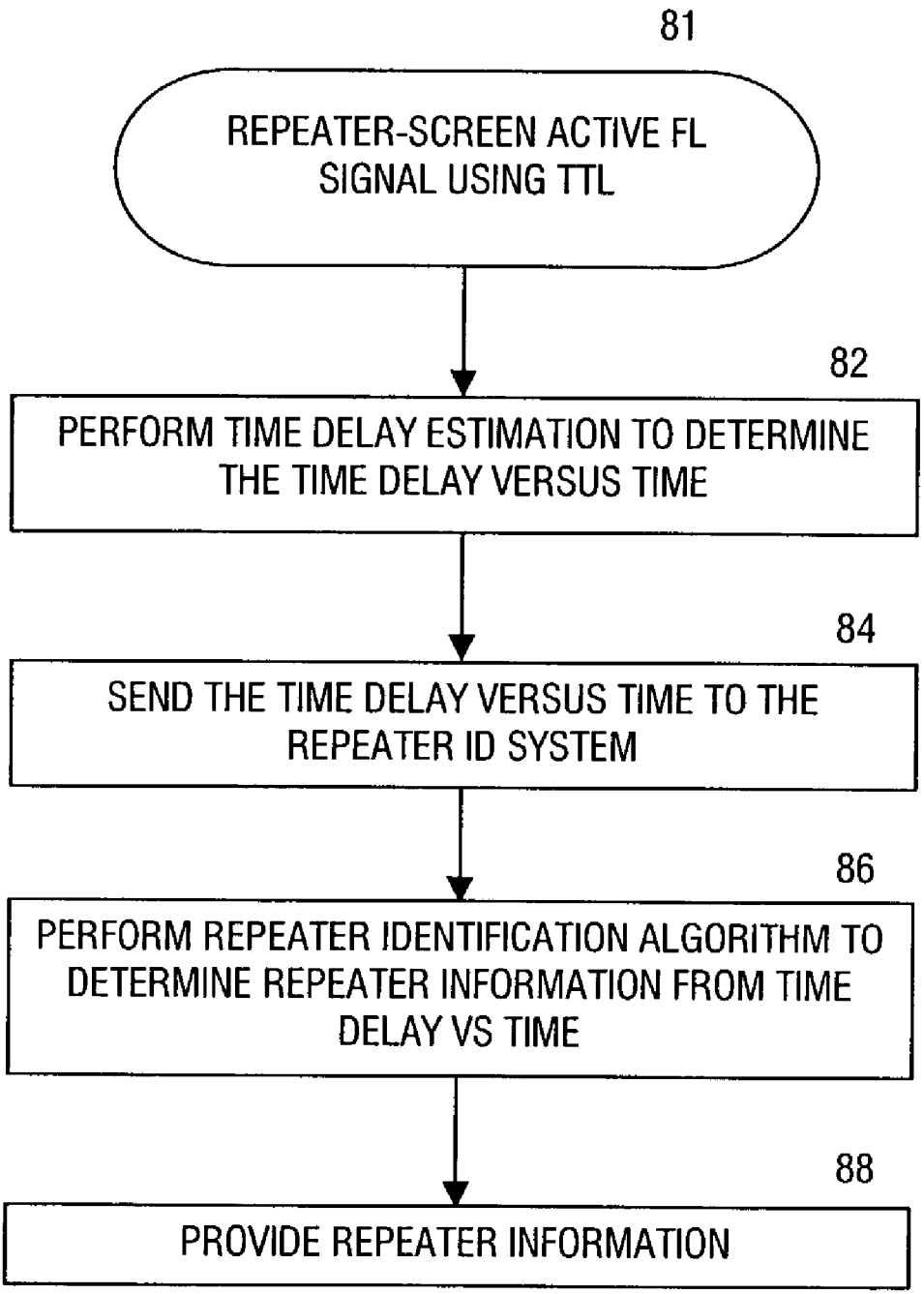
FIG. 8 is a flow chart that illustrates on example embodiment for repeater-screening of active FL signals using the TTL.
Figure 9:
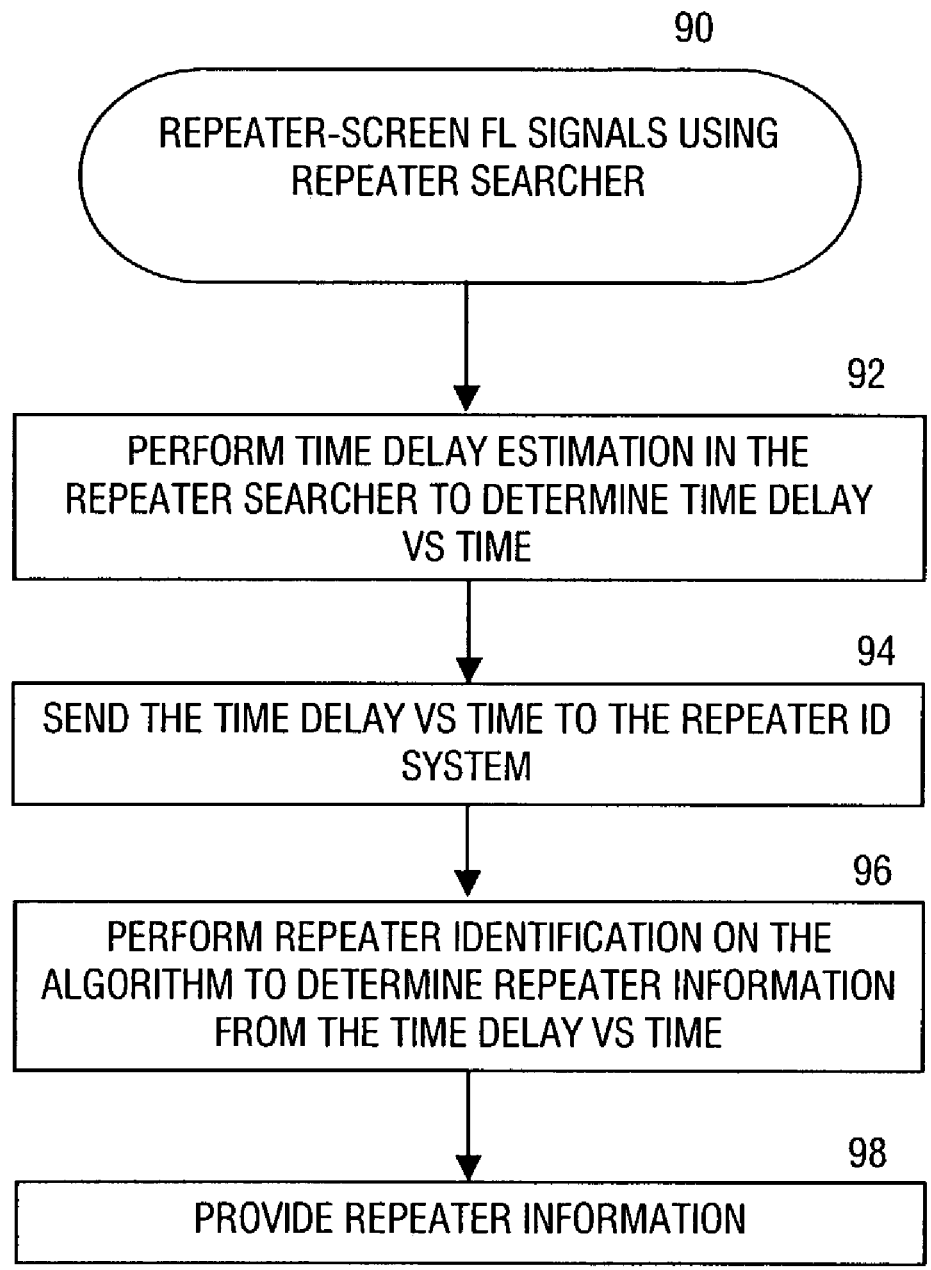
FIG. 9 is a flow chart that illustrates another example embodiment for repeater-screening of FL signals using the repeater searcher.

Reference is now made to FIG. 7, which is a flow chart that illustrates two core steps involved in repeater-screening an FL signal, and to FIGS. 8 and 9, which are flow charts that illustrate two examples, of how repeater-screening may be implemented in a mobile station.

The flow chart of FIG. 7, starting at 77, illustrates repeater-screening of FL signals by a mobile station. Particularly, the core steps described herein may be implemented in a wireless network in which a mobile station may receive watermarked repeated signals, wherein the watermark comprises a time-delay watermark.

At 78, time delay estimation is performed on an FL signal at the mobile station. The time delay estimation is performed by a time delay estimator (TDE) such as shown in FIG. 6, at 62 and 74 to determine time-delay waveform from the FL signal, if any.

At 79, a repeater identification algorithm is performed on the time-delay data received from the time estimation step in order to identify repeater information from the time delay data. The repeater identification may be performed by a repeater ID system such as shown in FIG. 6 at block 72, for example.

At 80, repeater information is provided to one of the mobile station PDS or a PDE so that the mobile station position may be determined using pilot phase measurements even in areas where repeaters are present.

Repeater information may include an indication that a signal is repeated, not repeated, or unknown; furthermore, in some embodiments the repeater information may include a unique repeater ID that identifies which repeater repeated the FL signal. For example, if the time delay is about zero for a period of time equaling about $T_{sequence}$, then the repeater information indicates that the FL signal is not repeated; however, if the time delay is greater than about zero, then the repeater information may include a repeater ID, as determined by the repeater ID system.

In embodiments wherein the repeater ID is encoded within the watermark, the repeater identification process includes determining repeater information from the time delay waveform by correlating the time delay waveform against a set of known watermarks; if a match is found above a certain threshold, then the repeater ID is known. In these embodiments, the PDS or PDE may then utilize information about the identified repeaters (e.g., their location and internal delays) to calculate the position of the mobile with the PPMs of repeated signals included.

Reference is now made to FIG. 8, starting at 81, which is a flow chart that illustrates one example embodiment of repeater-screening an FL signal, wherein time delay estimation is performed by the time tracking loop (TTL) of the mobile station (FIG. 6).

At 82, time delay estimation is performed to determine the time delay of the FL signal versus time. In this embodiment, the time delay estimation is performed by a time delay estimator (TDE) in a TTL (see FIG. 6, block 62), which estimates the time delay of the FL signal versus time and outputs the time delay data.

At 84, the time delay from the time delay estimation step is sent to the repeater ID system for repeater identification. It may be noted that the time delay data may be processed through a control system or other means in the MS, or may be sent directly to the repeater ID system for processing.

At 86, a repeater identification algorithm is performed on the time delay received from the time delay estimation step to determine repeater information from the FL signal, such as described in more detail with reference to FIG. 7, block 79.

At 88, repeater information is provided to one of the mobile station PDS or a PDE so that the mobile station position may be determined using pilot phase measurements even in areas where repeaters are present.

Reference is now made to FIG. 9, starting at 90, which is a flow chart that illustrates another example embodiment of repeater-screening an FL signal, wherein time delay waveform estimation is performed by the repeater searcher of the mobile station (FIG. 6).

At 92, time delay estimation is performed to determine the time delay of the FL signal versus time. In this embodiment, the time delay estimation is performed by the time delay estimator (TDE) in the repeater searcher (FIG. 6), which estimates the time delay of the FL signal versus time and outputs the time delay data.

At 94, the time delay data from the time delay estimation step is sent to the repeater ID system for repeater identification. It may be noted that the time delay data may be processed through a control system or other means in the MS, or may be sent directly the repeater ID system for processing.

At 96, a repeater identification algorithm is performed on the time delay data received from the time delay estimation step to determine repeater information from the FL signal, such as described in more detail with reference to FIG. 7, block 79.

At 98, repeater information is provided to one of the mobile station PDS or a PDE so that the mobile station position may be determined using pilot phase measurements even in areas where repeaters are present.

Figure 10:
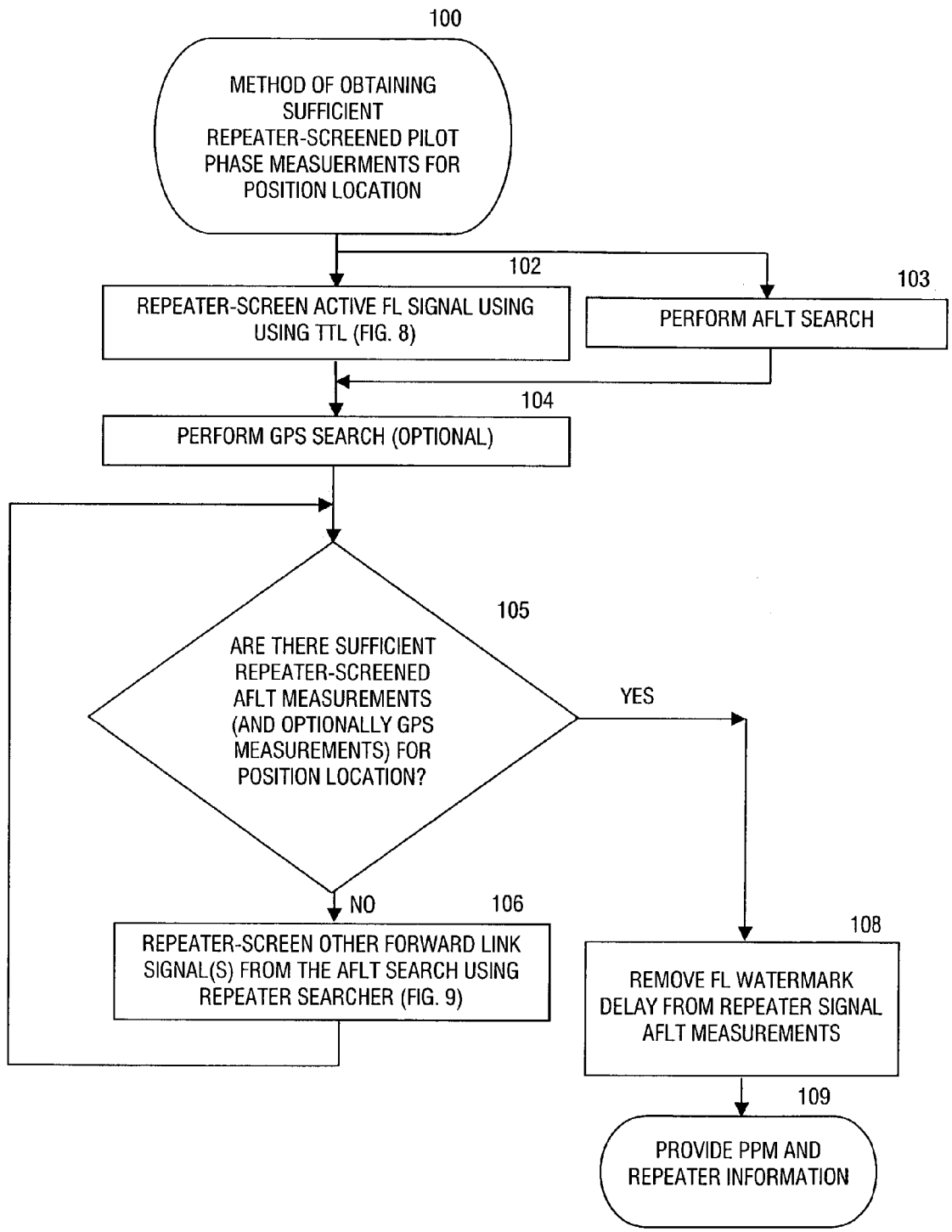
FIG. 10 is a flow chart that illustrates one example method of obtaining sufficient measurements for position location using repeater-screened measurements.

FIG. 10, starting at 100, is a flowchart that illustrates one example method for obtaining sufficient repeater-screened measurements for position location in areas where repeaters are present.

At 102, TTL repeater-screening is performed on an active FL signal, including time delay estimation performed in the TTL of the mobile station such as described with reference to FIG. 8.

At 103, an AFLT search is run on pilot signals in parallel with the TTL-based repeater-screening of the active FL signals (102) and the measurements from the regular AFLT-search may be stored in a database.

Optionally, at 104, a GPS search may also be performed.

At 105, determination of sufficient GPS measurements (if applicable) and TTL repeater-screened measurements for position location determination is performed. It may be noted that in an A-GPS system, only one or two additional PPMs may be necessary to determine position location (in combination with PRM measurements from GPS), while in other AFLT only systems, four or more PPMs may be necessary to obtain sufficient measurements for position location determination. If sufficient measurements have been obtained, the processing moves to block 108. If sufficient measurements have not been obtained, then processing moves to block 106.

At 106, if sufficient measurements for position location are not obtained using TTL repeater-screening on the active FL signal, repeater-screening is performed on other FL signal(s) from the AFLT search, including time delay estimation performed in the repeater searcher of the mobile station such as described with reference to FIG. 9. The process flow then returns to 105 and this process is repeated until sufficient GPS measurements (if applicable) and repeater-screened pilot phase measurements for position location determination have been obtained.

In one example CDMA implementation, repeater-screening using the repeater searcher is performed only on pilot signal samples of FL signals that are not in the active set in the interest of saving time and because repeater-screening of the active pilot signal(s) was already performed using TTLs as described in block 102. However in other embodiments, the repeater-screening using the repeater searcher may also run on the active pilot signal(s), which may achieve a more accurate estimate of the FL signal time delay versus time in some implementations.

At 108, once a sufficient number of FL signals have been repeater-screened for position location determination, removal of the time delay is performed on the AFLT measurements for FL signals identified as repeated so that accurate pilot phase measurements may be provided for position location (i.e., the AFLT measurements must be adjusted to compensate for the time delay watermark measured by the TDE). In order to remove the time delay watermark from the AFLT measurements, the mobile station may subtract the estimated time delay from the pilot phase measurements at or near the corresponding time (stored in a database), which results in time-corrected pilot phase measurements.

At 109, all measurements, including PRMs from GPS (if applicable), PPMs from the AFLT search, and repeater information obtained from the repeater identification step, are sent to the appropriate system (e.g., PDS or PDE) for processing the position of the mobile station.

As described elsewhere in more detail, the repeater information may comprise an indication of whether or not the signal is successfully repeater-screened (e.g. the repeater search was not even attempted, or the repeaters search has been attempted but failed, or repeater search has been successfully performed), whether or not the signal is detected as repeated, and in some embodiments, the unique repeater ID associated with the repeated signal. This repeater information will aid the MS position determination system or a PDE in accurately determining position of the mobile station, even if some or all of the signals are repeated.

Figure 11:
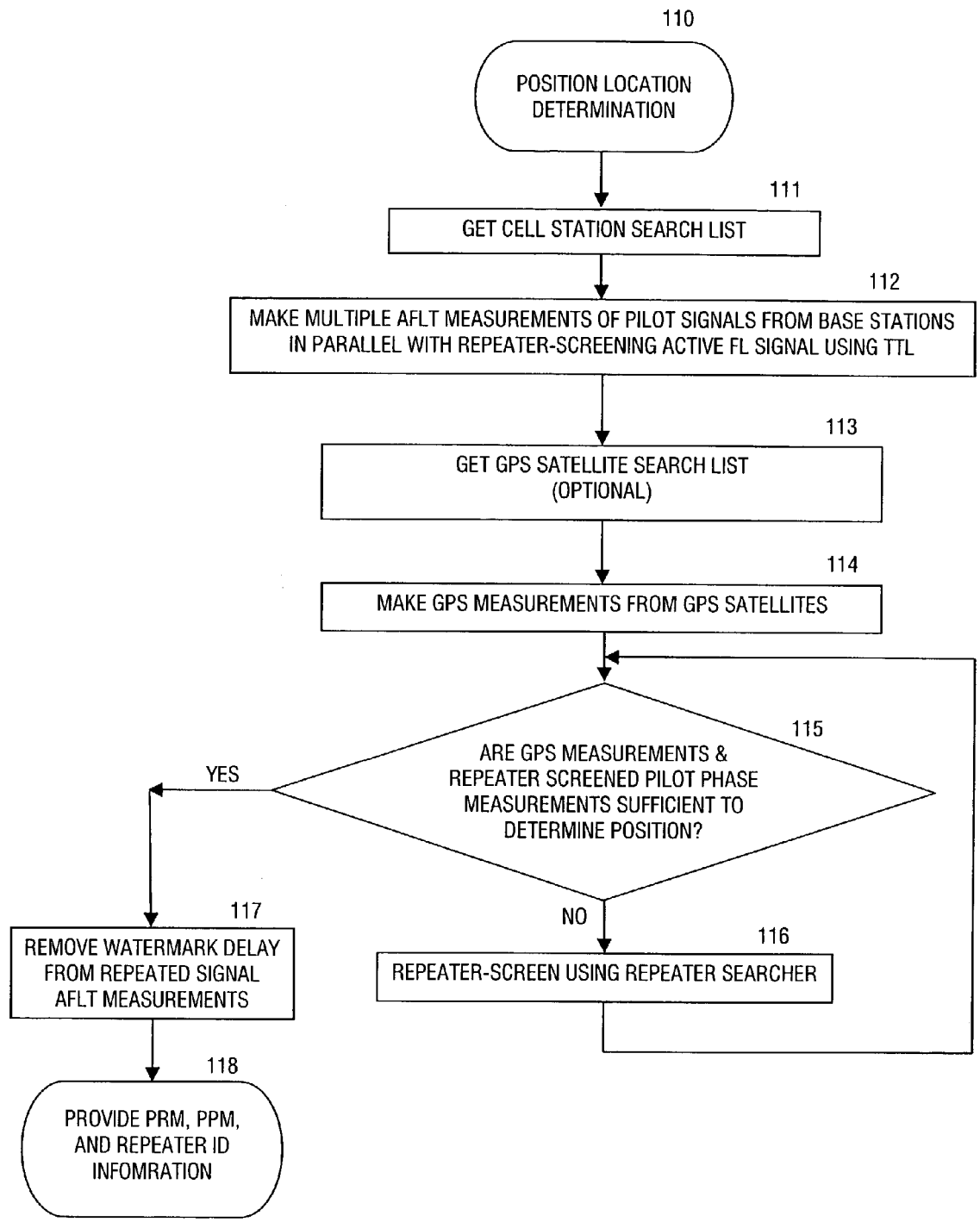
FIG. 11 is a flowchart that illustrates one example method of determining the position of the mobile station using an AFLT or A-GPS system in cellular coverage areas where repeaters are present.

FIG. 11, starting at 110, is a flowchart of one example method of determining position location of the mobile station using an AFLT or A-GPS in cellular coverage areas where repeaters are present. It should be apparent that many different methods of determining position may be implemented using the repeater identification system disclosed herein.

At 111, a search list of cellular BTS neighbors is obtained. The cell search list will be used to search for pilot signals from the cellular stations on the list, and it may also include information useful in finding the pilot signals of the stations on the list.

The cell search list may be obtained in a variety of ways; in one simple embodiment, the cell search list includes all possible pilot signals in a cellular system; however, searching all the possible pilot signals may consume an undesirable amount of time. In order to save time in one embodiment, a local cellular base station communicating with the mobile station can provide the cell search list for the mobile station, including the search windows over which to search for each pilot signal. Note that the cell search list could be modified to also include any repeater aiding information that is available to the serving base station, if any, such as all the possible repeaters on PNs in the list, their IDs, and their internal delays (and potentially their locations, if position location is to be performed at MS). This may aid in reduction of repeater time-to-identify and thus time-to-fix.

At 112, AFLT measurements are taken of the pilot signals from each cellular BTS on the cell search list. In parallel with the AFLT search, the active FL signal is TTL repeater-screened, such as described in more detail with reference to FIG. 8.

In one embodiment, the AFLT measurements include an earliest time-of-arrival (TOA) estimate, an RMSE estimate of the path providing the earliest TOA, and an Ec/Io estimate for all resolvable paths of the pilot signal, which will be used to update the Ec/Io for the pilot signal. The measurements may be stored in a PPM database such as shown in FIG. 6 in which each pilot signal is associated with a plurality of related measurements. It may be noted that, even if the strength of a pilot signal is insufficient to establish communication, the pilot signal may still have enough strength to be detected and to be able to measure the time-of-arrival and other qualities.

At 113, a GPS satellite search list may be obtained. This is an optional operation, which advantageously provides a search list that can be used by the GPS system to look for satellites thereby reducing the time necessary to locate sufficient satellites to get a position fix. Alternatively, the GPS system can simply search the entire sky; however such a full sky search typically consumes a much longer time.

At 114, GPS measurements are obtained in accordance with suitable GPS procedures. In one embodiment, the GPS communication system first looks for the satellites specified in the viewable satellite list over the search windows specified in the list, which can significantly reduce the time required to obtain sufficient GPS signals.

At 115, the MS determines if sufficient GPS measurements and TTL repeater-screened measurements have been obtained to determine position location. If sufficient measurements have been obtained, there is no reason to incur further processing in the MS, the processing goes to block 117 in the flow diagram to remove the time delay watermark from any repeated signals. If sufficient measurements have not been obtained, the processing goes to 116 and a repeater search is run as described below.

At 116, FL signals are repeater-screened using the repeater searcher, such as described in more detail with reference to FIG. 9. Since the repeater search is performed on pilots already found in the AFLT search, the searching is performed over small search windows, and the repeater searcher is able to do them simultaneously. The process flow then returns to 115 and this process is repeated until sufficient GPS measurements and repeater-screened AFLT measurements for position location determination have been obtained.

At 117, once a sufficient number of PPMs have been repeater-screened for position location determination, the time delay watermark on the AFLT measurements for FL signals identified as repeated must be removed, such as described in more detail with reference to block 108 in FIG. 10, above.

At 118, pseudo-range measurements (PRM) from the GPS search, pilot phase measurements (PPM) from the regular AFLT search, and repeater information from the repeater identification step may be provided to a PDS housed within the MS or at a PDE at a location external to the MS, but in wireless communication therewith. The PDS or PDE processes all these measurements to obtain MS position location, such as described elsewhere in more detail.

It may be noted that for call flows that involve calculations of the initial coarse position (i.e., pre-fix) based on the AFLT measurements for the purposes of creating more accurate GPS aiding information (smaller GPS windows), repeater-screening using the TTL and/or the repeater searcher should be performed (and the detected watermark removed from the AFLT results of repeater FL signals) prior to using the regular AFLT search measurements in the pre-fix calculation in order to provide more accurate initial coarse position and GPS search windows. An example of the mobile station initial coarse position determination (i.e., pre-fix) could follow the flowchart of FIG. 10 (without the optional GPS search). An example of the mobile station final position determination (i.e., final-fix) could follow the flowchart of FIG. 11.

Finally, in some embodiments, a concept of preferred response quality may be incorporated, where different preferred response quality values are consistent with desired repeater search sensitivity, target probabilities, scope/yield and maximum allowable time-to-identify. In this manner, we can have different preferred response quality values for initial coarse position (i.e., pre-fix) and final position determination (i.e., final-fix) repeater search, to allow for different maximum time-to-identify requirements between the two. Furthermore, we may have different preferred response quality values for final-fix as well, to allow for possible differing requirements of various types of the application on the repeater detection process.

It will be appreciated by those skilled in the art, in view of these teachings, that alternative embodiments may be implemented without deviating from the spirit or scope of the invention. This invention is to be limited only by the following claims, which include all such embodiments and modifications when viewed in conjunction with the above specification and accompanying drawings.

What is claimed is:

1. A method for determining a position location of a mobile station using forward link pilot signals, including repeater-screening the forward link pilot signals to determine repeater information, comprising:

modulating at least some of said forward link pilot signals at a repeater with a time-varying delay element to watermark repeater information thereon;

receiving at least some of said forward link pilot signals in the mobile station, including repeated forward link pilot signals on which said watermark information has been modulated;

taking pilot phase measurements from said received forward link pilot signals;

estimating a time-varying delay of forward link pilot signals over a period of time;

performing repeater identification in the mobile station responsive to said time-varying delay to identify whether the forward link pilot signal is repeated;

repeater-screening said forward link pilot signals based upon said repeater identification;

determining if sufficient repeater-screened forward link pilot phase measurements have been obtained for position location determination;

if insufficient repeater-screened forward link pilot phase measurements have been obtained, then repeating said estimating a time varying delay, performing repeater identification, and repeater-screening said forward link pilot signals on at least one additional received forward link signal until sufficient repeater-screened pilot phase measurements have been obtained for position location determination;

correcting said pilot phase measurements including substantially removing said estimated time-varying delay from forward link signals identified as repeated; and providing pilot phase measurements and any repeater information for the forward link pilot signals to a position determining entity to determine a position of said mobile station.

2. The method of claim 1, wherein said performing repeater identification comprises correlating said time-varying delay estimate with a set of known time delay watermarks to identify repeater information.

3. The method of claim 2, wherein said performing repeater identification further comprises identifying a unique repeater ID.

4. The method of claim 1, further comprising performing a GPS search prior to said estimating a time-varying delay in order to retrieve pseudo-range measurements.

5. The method of claim 4, further comprising determining if sufficient GPS pseudo-range measurements have been obtained for position location purposes prior to said estimating a time-varying delay.

6. The method of claim 1, wherein said estimating a time-varying delay includes estimating said time-varying delay using a time tracking loop.

7. The method of claim 1, wherein said estimating a time-varying delay includes estimating said time-varying delay using a repeater searcher.

8. The method of claim 1, wherein said estimating a time-varying delay is done for active forward link pilot signals using time tracking loops concurrently with said receiving a plurality of forward link pilot signals, and said estimating a time-varying delay of at least another received forward link signals is done using a repeater searcher.

9. The method of claim 8, further comprising performing a GPS search before said determining if sufficient repeater-screened forward link pilot phase measurements have been obtained to retrieve pseudo-range measurements.

10. The method of claim 9, wherein said determining if sufficient repeater-screened forward link pilot phase measurements have been obtained further includes determining if sufficient GPS pseudo-range and repeater-screened forward link pilot phase measurements have been obtained for position location.

* * * * *